United States Patent [19]

Geiger

[11] Patent Number: 4,637,120

[45] Date of Patent: Jan. 20, 1987

[54] DEVICE FOR CHANGING OF TOOLS OR THE LIKE INTO THE WORK SPINDLE OF A MACHINE TOOL

[75] Inventor: Michael Geiger, Starnberg, Fed. Rep. of Germany

[73] Assignee: Friedrich Deckel Aktiengesellschaft, Munich, Fed. Rep. of Germany

[21] Appl. No.: 708,997

[22] Filed: Mar. 7, 1985

[30] Foreign Application Priority Data

Mar. 9, 1984 [DE] Fed. Rep. of Germany ....... 3408734

[51] Int. Cl.$^4$ ............................................ B23Q 3/157
[52] U.S. Cl. ...................................................... 29/568
[58] Field of Search ................... 29/568, 26 A; 408/31

[56] References Cited

U.S. PATENT DOCUMENTS

| | | | |
|---|---|---|---|
| 3,449,823 | 6/1969 | Jerue | 29/568 |
| 3,719,987 | 3/1973 | Seidel | 29/568 |
| 4,050,146 | 9/1977 | Geiger | 29/568 |
| 4,205,427 | 6/1980 | Koch et al. | 29/568 |

FOREIGN PATENT DOCUMENTS

| | | | |
|---|---|---|---|
| 2013836 | 10/1970 | Fed. Rep. of Germany | |
| 2700502 | 7/1978 | Fed. Rep. of Germany | |
| 3017613 | 11/1981 | Fed. Rep. of Germany | 29/568 |
| 3126612 | 3/1983 | Fed. Rep. of Germany | |
| 30639 | 2/1984 | Japan | 29/568 |
| 737192 | 5/1980 | U.S.S.R. | 29/568 |

Primary Examiner—Gil Weidenfeld
Assistant Examiner—Daniel W. Howell
Attorney, Agent, or Firm—Flynn, Thiel, Boutell & Tanis

[57] ABSTRACT

The invention relates to a device for changing of tools into the work spindle of a machine tool. It includes a two-arm changing arm, the axis of rotation of which is positioned at an angle of 45° with respect to the work spindle, and the gripping ends of which are angled each at 45° toward the axis of rotation. The tools are inserted into the changing arm with the ends, which are to be inserted into the spindle, pointing away from the axis of rotation, so that, in particular when using long tools, a smaller flight circle and thus a smaller collision free space, which is to be kept free, results. Therefore, the device is particularly suited for machine tools with two spindles. The entire changing arm with its support, which permits the change rotation and the pulling out and inserting movement of the tool out of and into the spindles, is pivotal about an axis which extends perpendicularly with respect to the plane which is defined by the spindles. With this the device can be changed over with one single pivoting movement to the different spindle directions.

11 Claims, 4 Drawing Figures

DEVICE FOR CHANGING OF TOOLS OR THE LIKE INTO THE WORK SPINDLE OF A MACHINE TOOL

FIELD OF THE INVENTION

The invention relates to a device for facilitating a changing of tools in a work spindle.

BACKGROUND OF THE INVENTION

Such changing arms facilitate generally the exchange of tools between a magazine of a milling machine, drilling machine or the like. They, however, can basically also be used for example to change workpieces into the work spindle of a turning lathe. The invention will be described in connection with a tool changer, however, is not to be limited thereto. The axis of rotation of the changing arm, which axis of rotation is positioned at an angle of 45° with respect to the work spindle, permits thereby an arrangement of the tool magazine in such a manner that the tools are oriented at an angle of 90° with respect to the work spindle and during the changing operation are swung into the direction of the work spindle.

A device of this general type is already known, in which the tools with the ends which are to be inserted into the work spindle are received pointing toward the axis of rotation of the changing arm.

Since the tools partly have very large diameters and are very long, a very large flight circle results during the change rotation of the tool arm, so that the changing arm must for this rotary movement be moved out of the machine area or the tool dimensions must be limited, in order not to collide with the machine or the chucked workpiece.

The purpose of the invention is to provide a device of this general type, which has a substantially smaller flight circle, so that the collision free space, which is to be kept free, can be substantially smaller.

The tools, which generally are received in conical tool holders, are arranged with the receiving cones pointing away from the axis of rotation, that is with the actual tool ends facing one another, in the changing arm. In order for the tools not to interfere with one another, the gripping ends of the changing arm are laterally offset such that the tool axes do not directly intersect. The outwardly pointing receiving cones have a standardized length which is designated for specific machines. The length in generally less than the largest existing tool length, so that the flight circle of the tools can be reduced through the inventive arrangement. Furthermore, because of the fixed size of the receiving cones, the collision free space, which is to be kept free, is also fixed, so that it does not need to be determined newly for each tool combination.

The lateral offset of the gripping ends of the changing arm is dimensioned such that the tools with the largest occurring diameter do not contact the axis of rotation.

In order for the changing arm to be able to insert the tools into the spindle or to remove same therefrom, it must be movable relative to the spindle in direction of the spindle axis. In some known solutions, the two arms themselves are secured swingably on the changing arm hub. However, in a preferred embodiment of the present invention, it is provided that the changing arm as a whole, that is with its support of the axis of rotation, is movable in the direction of the spindle axis, as it is actually already known. This movement can at the same time be used to pull a tool out of a tool magazine or to insert same into the tool magazine. Depending on the position of the tool magazine and depending on the position of the tools in the tool magazine, the changing arm can, however, also be designed for further movements for pulling of tools out of the magazine or for inserting of tools into the magazine.

The collision problem is of particular importance in machine tools with for example two work spindle axes, which are positioned at an angle to one another, be it that two fixedly installed spindles are provided or one spindle can be adjusted in various positions. A changing arm is provided inventively for this case, which changing arm as a whole, that is with its rotation and movement support, is pivotal additionally about a swivel axis which is aligned perpendicularly with respect to the plane which is defined by the spindle axes in an area which corresponds with the angle between the spindle axes. The changing arm can by thus pivoting about the swivel axis be adjusted to the various directions of the spindle axes. The inserting and removing movements which spatially follow the pivoting movement and the rotary movement are carried along into the various pivoting positions, so that they are available for all axial directions.

A further development of the invention provides that the changing arm as a whole is movable perpendicularly with respect to the spindle plane which is defined by the spindle axes and that it cooperates with a tool magazine which is arranged at the end of the path of movement remote from the machine. The shifting movement itself can thereby be used for inserting the tools into the tool magazine and for pulling the tools out of the tool magazine; a further advantage results when the swivel axis coincides with the axis of the tool which is aligned perpendicularly with respect to the spindle plane, since then the tool maintains its position in relationship to the magazine during the change over from one spindle axis direction to the other, so that the transfer place between changing arm and magazine remains the same for both spindle axis directions.

One exemplary embodiment of the invention provides, for supporting the changing arm, a beam which extends perpendicularly with respect to the spindle plane, a supporting block which is movable in the direction of the beam on the beam and is arranged pivotally about a swivel axis which extends perpendicularly with respect to the spindle plane, and a bearing housing which is arranged movably parallel to the spindle plane on the supporting block, in which bearing housing the axis of rotation of the changing arm is rotatably supported and in which is received a drive motor which is connected to the axis of rotation. The beam itself can thereby be pivotal about the swivel axis and can thereby take along the supporting block. A further development of the invention provides that the tool magazine itself is also pivotal about the swivel axis, so that the orientation of the magazine with respect to the changing arm is maintained during its pivoting movement.

BRIEF DESCRIPTION OF THE DRAWINGS

One exemplary embodiment of the invention is illustrated in the drawings and will be described in greater detail hereinafter.

In the drawings.

DETAILED DESCRIPTION

Figure 1:
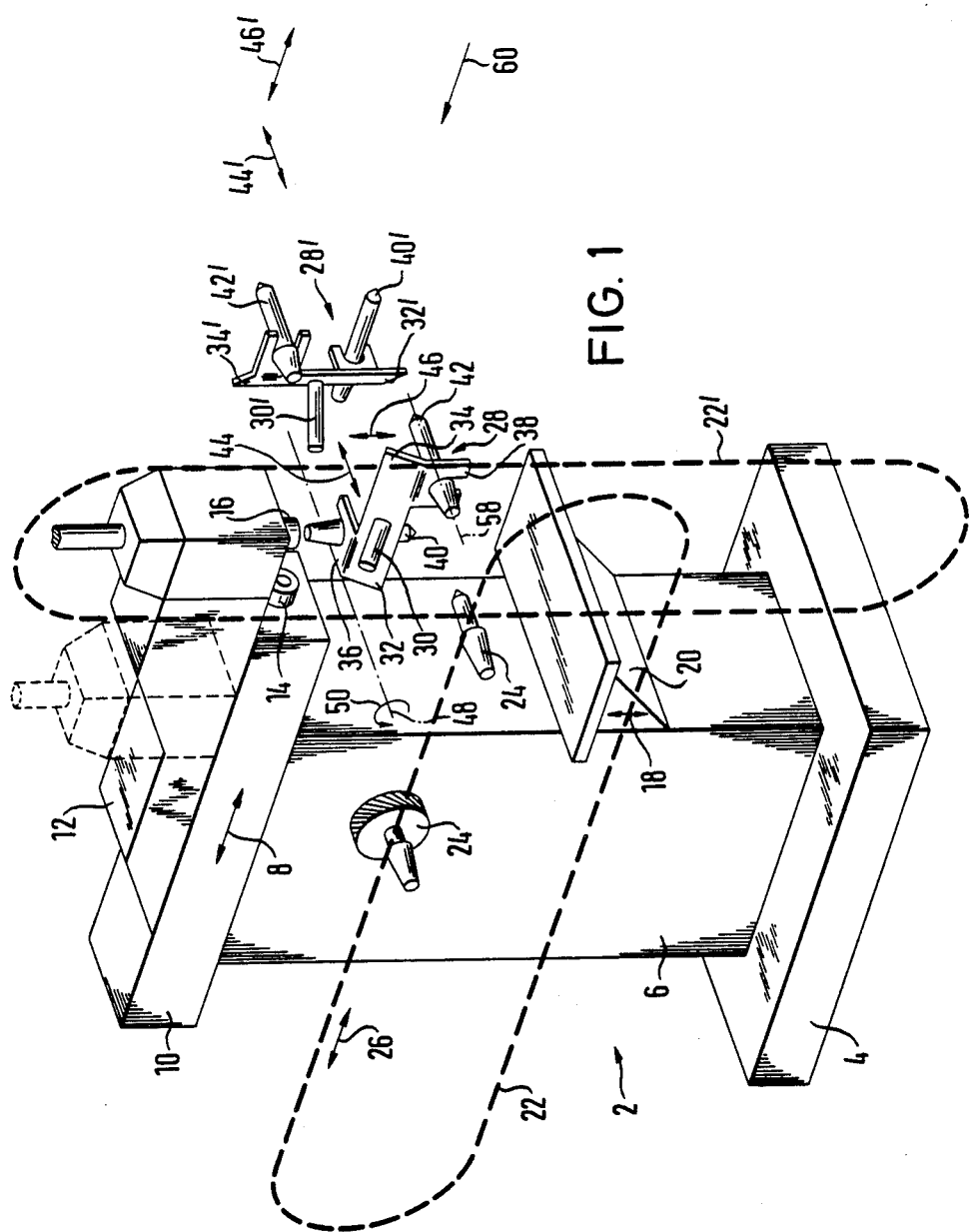
FIG. 1 is a schematic perspective illustration of a universal milling and drilling machine having a horizontal and a vertical work spindle and having a changing arm which can be changed over to the two work spindle directions.

FIG. 1 illustrates schematically a common universal drilling and milling machine 2 having a base 4, a pedestal 6, a spindle arm 10 which is movably supported in direction of the arrow 8 on the pedestal 6 and a spindle block 12 which is arranged on the spindle arm 10. A horizontal spindle 14 is supported in the spindle arm 10, a vertical spindle 16 is supported in the spindle block 12, and both spindles are connected to a drive which is not illustrated. The tool table 20 for receiving a workpiece is arranged on the front side of the pedestal and is movable in direction of the arrow 18. A chain magazine 22 is arranged on the side of the machine 2 which faces the viewer, which magazine carries a series of tools 24. The chain magazine 22 is supported rotating in a common and, therefore, not in detail identified manner in direction of the arrow 26 and is connected to a rotary drive, so that all tools 24 can be moved into a specific change position in which they can be removed from the magazine by the changing arm 28 or 28' or also by any desired intermediate changing means.

The changing arm 28 has two arms 32,34 which are aligned radially with respect to an axis of rotation of an axle or shaft 30. Gripping devices 36,38 for gripping of tools 40,42 are constructed at the gripping ends of the arms 32,34.

The changing arm, which is identified by the reference numeral 28 in FIG. 1, is adjusted for operating the vertical work spindle 16. As can be recognized in FIG. 1, the axis of rotation of the axle 30 is inclined at an angle of 45° with respect to the direction of the axis of the spindle 16. The gripping ends are each bent at an angle of 45°, so that the two tools 40,42 define an angle of 90° with one another. The gripping ends of the arms 32,34 are offset laterally with respect to one another with respect to a plane which is parallel to both tool axes and which contains the axis of rotation of the axle 30, so that the axes of the tools 40,42 do not intersect directly. The tools 40,42 are inserted into the changing arm such that they, with their ends which are to be inserted into the work spindle and which here are constructed in a common manner as standard cones, point away from the axis of rotation of the axle 30. The lateral spacing between the gripping ends is preferably dimensioned such that two tools with the largest provided diameter do not contact one another.

The changing operation is done in the following manner: The gripping device 38 holds a tool 42, which has been removed from the magazine 22; the gripping device 36 is empty. The changing arm 28 is moved in direction of the arrow 44, whereby it grips the tool 40 which is contained in the vertical work spindle 16. The changing arm 28 then moves in direction of the arrow 46, whereby it removes the tool 40 from the work spindle 16. After this operation, the changing arm 28 is in the position which is illustrated in FIG. 1. The positions of the tools 40 and 42 are exchanged with one another by a rotation about the axis 30. The changing operation is finished by an inserting movement in direction of the arrow 46 and a releasing movement in direction of the arrow 44. In the now following working phase of the machine, the changing arm 28 can be moved to the magazine 22, where it deposits the tool 40 which has been taken out of the spindle 16 and removes a new tool.

In order to change the machine 2 over to a horizontal spindle operation, the spindle block 12 is first swung out of the work area or, as it is illustrated with dashed lines in FIG. 1, moved. The changing arm is then pivoted in direction of the arrow 50 about a swivel axis 48 which extends perpendicularly with respect to the plane which is defined by the axes of the spindles 14,16, so that it assumes substantially the position which is identified by the reference numeral 28'. It is remarked, that in FIG. 1, the changing arm 28' is illustrated moved to the right for reasons of a better understanding. Since the changing arm is pivoted as a whole, that is with the bearings which permit the movements 44 and 46, it can now carry out the movements 44' and 46' in its position 28'. The changing operation takes place corresponding with the aforedescribed changing operation in such a manner that the changing arm 28' is moved in direction of the arrow 44', whereby it grips the tool 40 which is contained in the work spindle 14. A movement in direction of the arrow 46' facilitates a pulling of the tool 40 out of the spindle. The positions of the tools 40' and 42' are exchanged by a rotation about the axis of rotation 30' which is positioned at an angle of 45° with respect to the work spindle 14, so that the tool 42' can be inserted into the spindle 14; the tool 40' is then in a spatial position in which it can be fed to the magazine 22 by a movement of the changing arm in direction of the arrow 44'.

As is also illustrated in FIG. 1, the tool magazine 22 can during pivoting of the changing arm about the swivel axis 48 also be pivoted about the axis into its position 22', so that the reciprocal movements between changing arm and magazine, which movements are needed for inserting or pulling of the tool into or out of the magazine, are maintained during the changing over of the changing arm.

Figure 2:
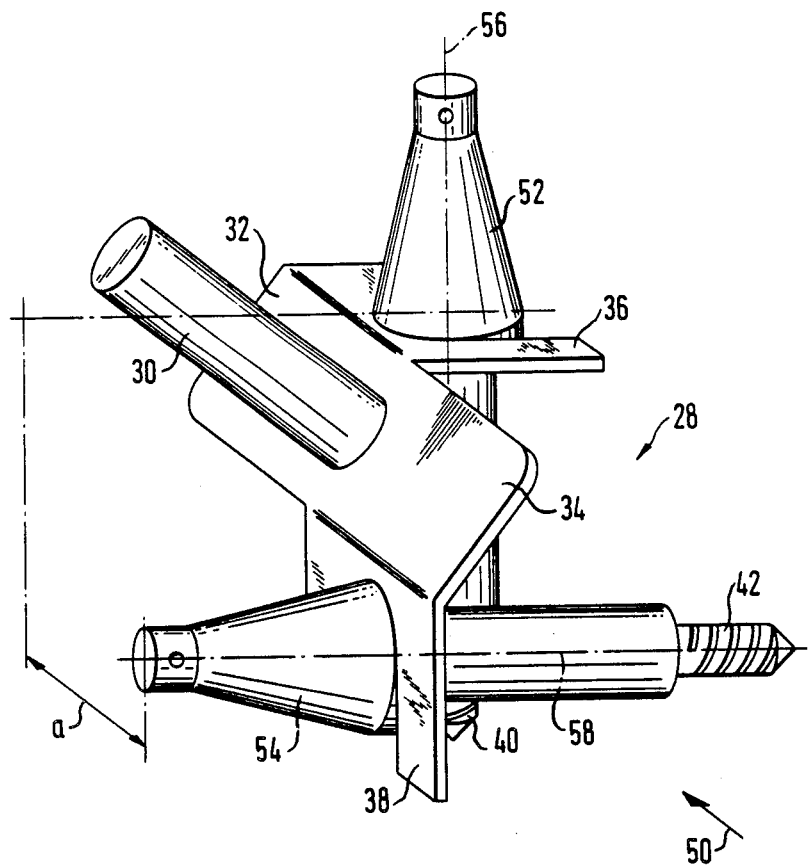
FIG. 2 is a schematic perspective illustration of a changing arm according to FIG. 1.

FIG. 2 shows the changing arm 28 in a perspective, schematical illustration. Arms 32,34, at the ends of which are arranged the gripping devices 36,38, extend radially with respect to the axis of rotation of the axle 30. It can be recognized, that, viewed in the direction of the arrow 50, the standard cones 52,54 of the tools 40,42, which standard cones are provided for insertion into the work spindles, are arranged pointing away from the axis of rotation of the axle or shaft 30. The gripping devices 36,38 are offset laterally with respect to a plane which lies parallel to the tool axes 56,58 and which contains the axis of rotation of the axle 30 such that the tool axes 56,58 do not cross directly, but have a displacement a between one another.

Figure 3:
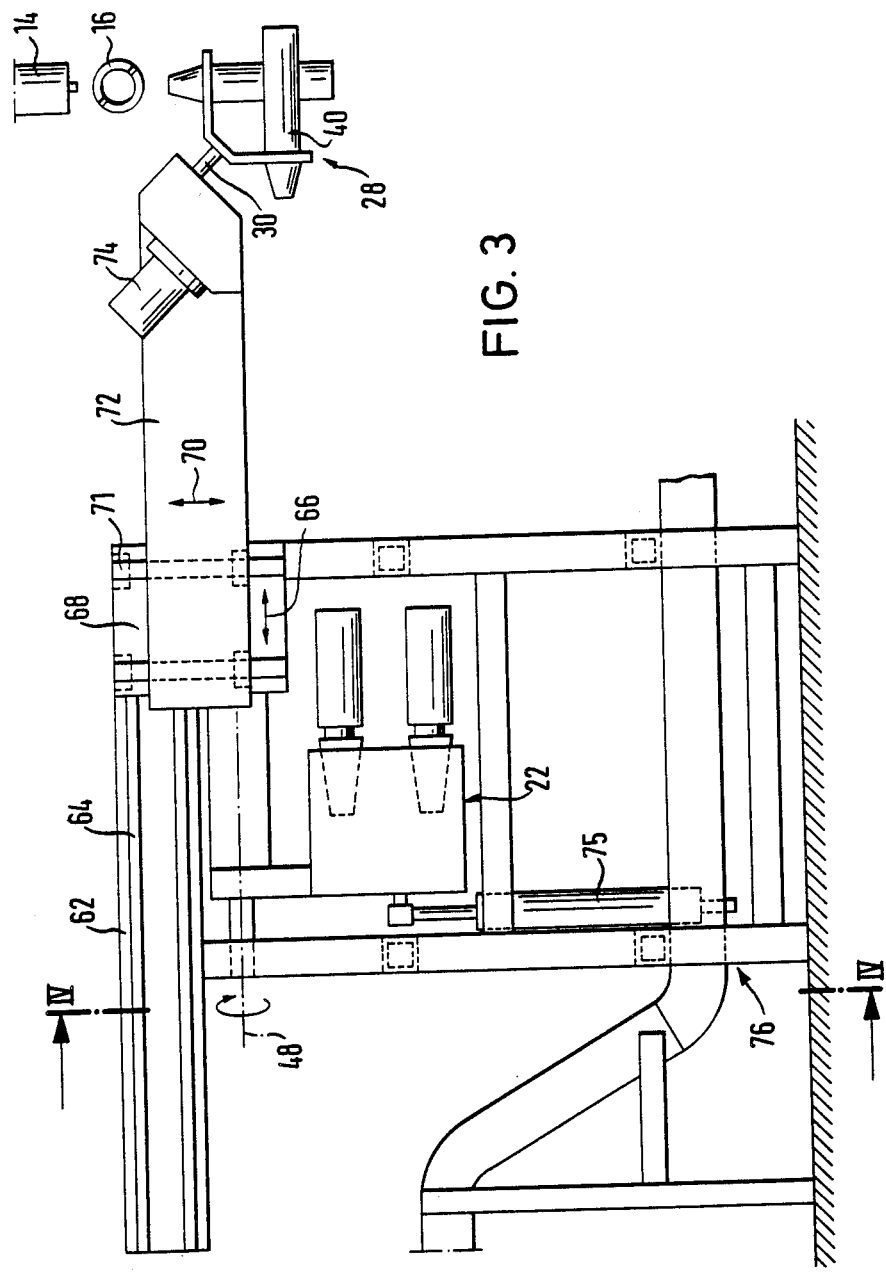
FIG. 3 illustrates a device for supporting the changing arm.

FIG. 3 illustrates, viewed in direction of the arrow 60 in FIG. 1, a device for supporting the changing arm 28, whereby for a better understanding, the machine tool itself was not illustrated. A supporting beam 62 having guideways 64 on which a supporting block 68 is movable in direction of the arrow 66, extends perpendicularly with respect to the spindle plane which is defined by the axes of the two spindles 14,16. The supporting block 68 has guideways 71 on which a bearing housing 72 is arranged movably in direction of the arrow 70. The axis of rotation of the axle 30 of the changing arm 28 is rotatably supported in the bearing housing 72 and is rotatably connected to a drive motor 74. As a comparison with FIG. 1 shows, the changing arm assumes in FIG. 3 the position which is needed to operate the vertical spindle 16. The direction of movement 66 corresponds with the direction of movement 44, the direction of movement 70 with the direction of movement 46 in FIG. 1. These movements can serve simultaneously to insert the tools into the magazine 22 or to remove the tools from the magazine 22. For this purpose, the changing arm 28 is first moved downwardly in direction of the arrow 70 until the tool 40 is aligned with a receiving position in the magazine 22. By moving the changing arm 28 to the left (FIG. 3), the tool 40 is inserted into the magazine. By a movement of the bearing housing 72 in direction of the arrow 70 upwardly, the changing arm 28 is released from the tool, so that the chain magazine is indexed on and a different tool can be moved into the change position. By moving the bearing housing 72 in direction of the arrow 70 downwardly, the new tool is gripped, it is removed from the magazine by a movement of the supporting block 68 in direction of the arrow 66 to the right and is fed to the machine tool 2 in the manner which will be described above. The supporting beam 62 with the supporting block 68 which is arranged thereon and the bearing housing 72 which is movably supported on the supporting block 68 is supported pivotally about the axis 48, as this has already been discussed in the description of FIG. 1. The magazine 22 is fixedly connected to the structural component which consists of the supporting beam 62, the supporting block 68 and the bearing housing 72, so that it is also pivoted about the axis 48. A hydraulic piston-cylinder-unit 74 is used as a pivot drive, which unit 74 engages the magazine 22 and is supported against a supporting frame 76 which holds the swingable group of structural parts.

Figure 4:
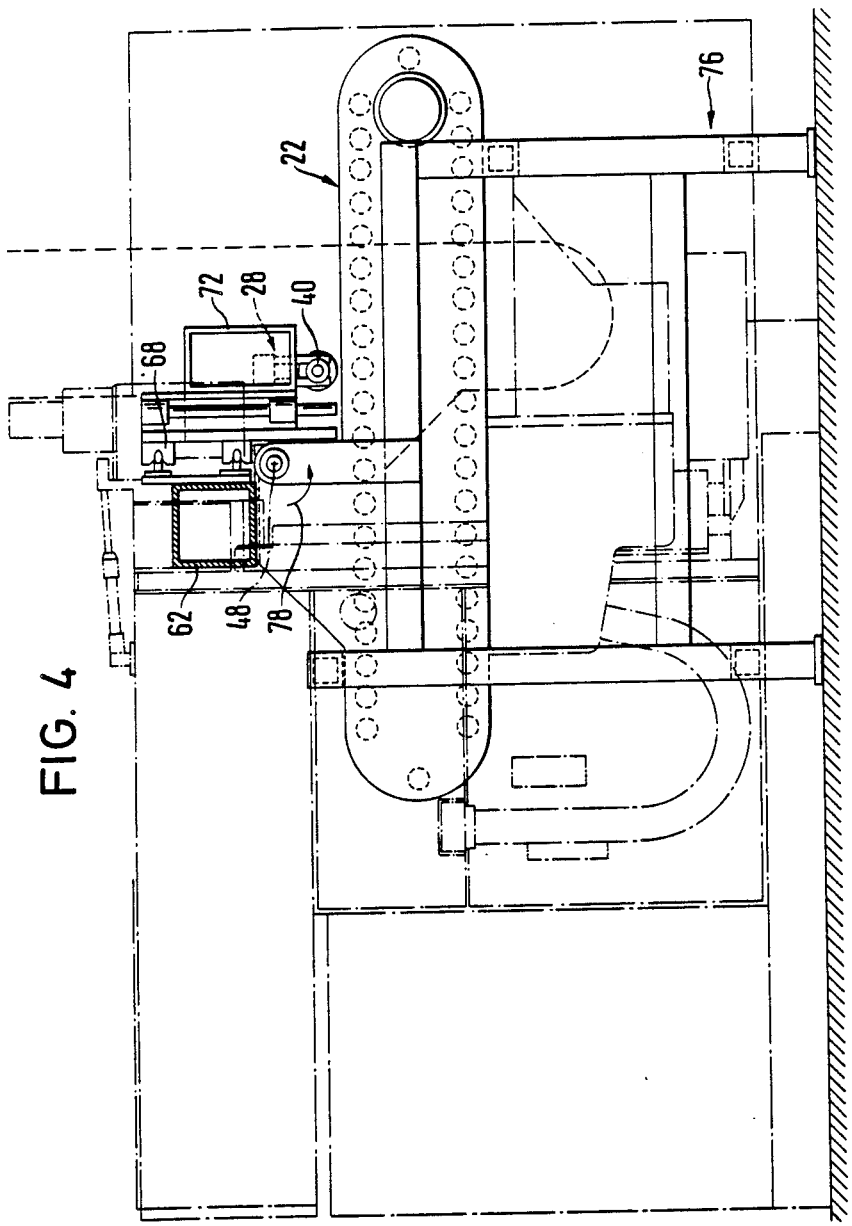
FIG. 4 is a view corresponding with the line IV—IV of a device according to FIG. 3.

FIG. 4 illustrates, in a view according to the line IV—IV in FIG. 3, the supporting frame 76 having the group of structural parts which consists of the supporting beam 62, the supporting block 68 and the bearing housing 72 for supporting the changing arm 28 and with the tool magazine 22 fixedly connected to said group of structural parts. The mentioned group of structural parts and the tool magazine assume the same position as is shown in FIG. 3, in which the changing arm 28 is aligned for operating the vertical work spindle. The mentioned group of structural parts with the tool magazine 22 can be pivoted about the axis 48 in direction of the arrow 78, which corresponds with the arrow 50 in FIG. 1 to cause the changing arm 28 to be changed over for the operation of the horizontal spindle, as has already been described.

If the reciprocal arrangement of the spindles 14,16 permits this, it can be advantageous to let the swivel axis 48 coincide with the tool axis 58 (see FIG. 1). The position of the tool 42 in the space remains then the same during the pivoting operation of the changing arm 28; such an arrangement is offered for example when the tool is not directly inserted into the magazine or is not directly removed from same by the changing arm 28, but through an intermediate changing means which transports the tool between the magazine and an in-between position, which could correspond with the above-described tool position.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for changing of tools in a work spindle of a machine tool, comprising a changing arm having a shaft and two arms which are aligned substantially radially with respect to an axis of rotation of said shaft, whereby said axis of rotation of said shaft is aligned at an angle of 45° with respect to an axis of said work spindle, each arm having a gripping end provided with gripping devices, and means for adjustably moving said changing arm relative to said work spindle in a spindle axis direction, the improvement comprising wherein said gripping ends of said arms are offset laterally with respect to one another with reference to a reference plane which extends through said axis of rotation, so that axes of said tools held by said gripping ends lie in spaced apart planes on opposite sides of and parallel to a plane containing said axis of rotation and do not, therefore, intersect, and wherein said gripping devices each include a support means for orienting said axes of said tools which are to be inserted into said work spindle so that said axes of said tools, on a side of said changing arm having said shaft thereon, extend away from said axis of rotation of said shaft.

2. A device according to claim 1, wherein said lateral offset spacing between said gripping ends of said changing arm corresponds at least to the largest existing tool radius of a tool which is to be inserted in said work spindle.

3. A device according to claim 1, wherein said means for adjustably moving said changing arm includes further means for effecting a simultaneous movement of said shaft in direction of said spindle axis.

4. A device according to claim 1, wherein said changing arm cooperates with a tool magazine and wherein said changing arm includes means for facilitating movements which serve to pull tools out of said tool magazine and to insert tools into said tool magazine.

5. A device according to claim 1, wherein said machine tool has two work spindle axes which are positioned at an angle to one another, wherein said changing arm includes pivot means for pivotally supporting said changing arm as a whole about a swivel axis positioned perpendicularly with respect to a spindle plane defined by said two work spindle axes, in an area which corresponds with the angle between said work spindle axes.

6. A device according to claim 5, wherein said changing arm can assume a first change position which is associated with a first work spindle, in which first change position a first gripping end is in front of a first work spindle with a tool orientation which lies in axial direction of said first work spindle and a second gripping end assumes a position which corresponds with a tool orientation which lies perpendicularly with respect to said spindle plane, and wherein said changing arm after a pivoting about said swivel axis can assume a second change position which is associated with a second work spindle, in which second change position a gripping end is in front of said second work spindle with a tool orientation which lies in axial direction of said second work spindle, and the other gripping end assumes a position which corresponds with a tool orientation which lies perpendicularly with respect to said spindle plane.

7. A device according to claim 6, wherein said changing arm as a whole is movably supported perpendicularly with respect to said spindle plane, and wherein said changing arm cooperates with a tool magazine arranged at an end of the path of movement of said changing arm.

8. A device according to claim 7, wherein said tools are arranged perpendicularly with respect to said spindle plane in said magazine.

9. A device according to claim 5, wherein said swivel axis coincides with a tool axis which is positioned perpendicularly with respect to said spindle plane.

10. A device according to claim 7, wherein an elongated beam is provided on said machine tool which extends perpendicularly with respect to said spindle plane, wherein a supporting block is provided on said beam and which is movable lengthwise of said beam and is pivotally supported for movement about said swivel axis, and wherein a bearing housing is arranged movably on said supporting block in a direction parallel with respect to said spindle plane, in which bearing housing said shaft of said changing arm is rotatably supported and to which shaft a drive motor is drivingly connected.

11. A device according to claim 7, wherein said tool magazine together with said changing arm can be pivoted about said swivel axis.

* * * * *